W. E. HANN.
LANDING GEAR FOR AERIAL VEHICLES.
APPLICATION FILED MAY 23, 1914.
1,207,690.
Patented Dec. 5, 1916.
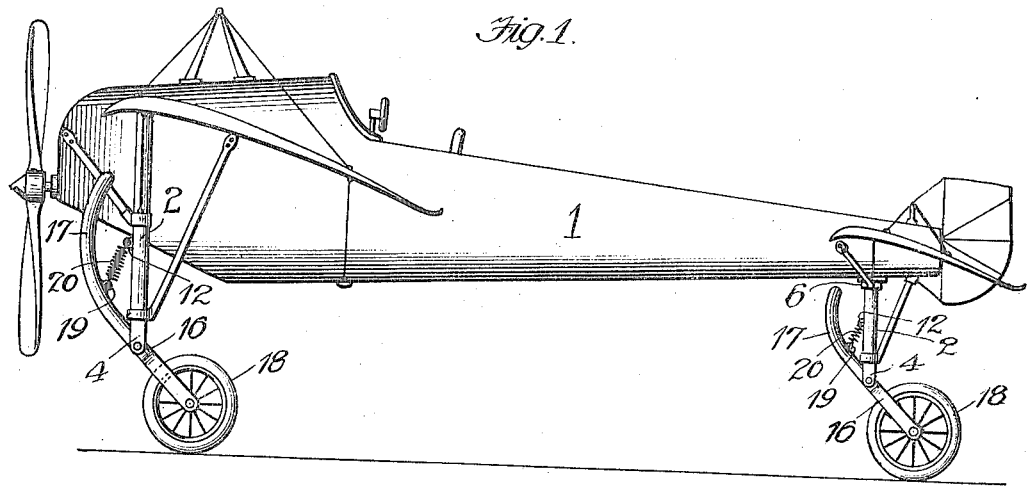
*Fig. 1.*
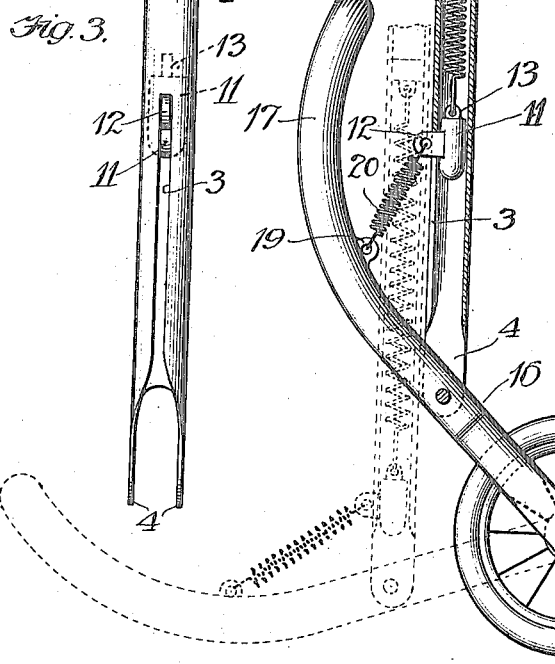
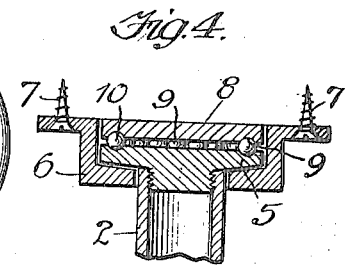
Witnesses
Martin H. Olsen.
Ju. H. Klaut.
Inventor
William E. Hann.

UNITED STATES PATENT OFFICE.

WILLIAM E. HANN, OF CHICAGO, ILLINOIS, ASSIGNOR OF ONE-HALF TO MAX R. HANN, OF CHICAGO, ILLINOIS.

LANDING-GEAR FOR AERIAL VEHICLES.

1,207,690.  Specification of Letters Patent.  Patented Dec. 5, 1916.

Application filed May 23, 1914. Serial No. 840,461.

*To all whom it may concern:*

Be it known that I, WILLIAM E. HANN, a citizen of the United States of America, and a resident of Chicago, county of Cook, State of Illinois, have invented certain new and useful Improvements in Landing-Gear for Aerial Vehicles, of which the following is a specification.

The main objects of this invention are to provide an improved landing gear for aerial vehicles adapted to relieve the vehicle of many of the jars and strains to which it is subjected when landing on rough and uneven ground and which tends to weaken the framework of the vehicle; to provide an improved form of shock absorber having a wide range of action; to provide a combination spring wheel and skid whereby under normal conditions the wheel of the device will support the vehicle, but when subjected to a greater strain or weight than ordinary the skid of the device will coöperate with the wheel to support the vehicle; and to provide a rotatable landing gear whereby the frame of the vehicle to which it is attached is relieved from any twisting strain when the landing gear is running over rough and grooved ground.

An illustrative embodiment of this invention is shown in the accompanying drawings in which,—

Figure 1 is a side elevation of an aerial vehicle equipped with this device. Fig. 2 shows in full lines an elevation, partly in section, of the device in its normal position, and in dotted lines, its position under great strain. Fig. 3 is a front elevation of the hollow strut or arm which carries the spring and plunger. Fig. 4 is a vertical sectional detail of the rotatable means for attaching the device to the aerial vehicle.

In the construction shown in the drawings the aerial vehicle 1 is shown equipped with this device. A normally stationary hollow strut or arm member 2 constructed preferably of steel tubing or the like, is suitably braced to the aerial vehicle and is provided with a slot 3 and a forked end 4. The strut or arm 2 is constructed to have a rotary movement and for this purpose an annular flange 5 rotatably mounted in a socket 6 is provided. The socket 6 is attached to the fusilage by any suitable means as screws 7. Between the flange 5 and the fusilage a wear plate 8 having a ball race 9 and balls 10 is provided to facilitate rotation of the strut.

Slidably mounted within the strut 2 is a plunger member 11 having lugs 12 and 13 thereon. The lug 12 extends through the slot 3 in the strut 2. The plunger 11 is yieldably retained within the strut 2 by means of a spring 14 engaging the lug 13 and having its other end engaging the lug or fixed connection 15 rigidly mounted within the strut. Pivotally mounted in the forked end 4 of the strut 2 is a lever or skid member 16 having a curved end 17 and a wheel 18 rotatably journaled at its other end.

To maintain the skid 16 in a substantially vertical position under normal conditions and to allow it to assume a substantially horizontal position with the curved end resting on the ground when subjected to a greater strain or weight than ordinary, a lug 19 is provided on the skid 16 and is connected to the lug 12 of the plunger 11 by a spring 20.

In the operation of the device, the resilient springs 14 and 20 are of sufficient strength to maintain the skid 16 in a substantially vertical position under normal weight and ordinary pressure, the vehicle to which the device is attached being supported on the wheel 18. When the device is subjected to a greater weight, as in the landing of aerial vehicles and especially upon rough and uneven ground, the springs will give sufficiently to absorb the shock and thereby prevent racking and straining of the vehicle frame.

Where the landing has been very abrupt and the pressure is greatly increased the device will assume the position shown in dotted outline in Fig. 2, the curved end 17 of the skid coming in contact with the ground and thereby coöperating with the wheel 18 to support the vehicle. It is under such a condition as this that the spring 14 comes into important use. The downward pull of the spring 20 on the lug 12 slides the plunger 11 down the strut 2, the strain being thereby partially equalized between the springs. This prevents the spring 20 from being stretched past its elastic limit and breaking, as would be the case if but one spring was used.

The strut 2 is rotatably attached to the frame of the vehicle by means of the socket 6. This construction prevents the twisting and consequent weakening of the frame of the vehicle from the wabbling of the wheel 18 occasioned by landing on rough and grooved ground.

Although but one specific embodiment and one modification of this invention is herein shown, and described it will be understood that many details of the construction shown may be altered or omitted without departing from the spirit of this invention as defined by the following claims.

I claim,—

1. A supporting gear for aerial vehicles, comprising a strut, a skid pivoted to said strut, a member slidably retained by said strut, yielding means between said member and skid, and coöperating means for yieldingly opposing the sliding of said member.

2. A supporting gear for aerial vehicles comprising a hollow strut, a plunger slidably mounted on said strut, resilient means interposed between said plunger and a fixed connection on said strut, a skid pivoted to the end of said strut, said skid having a curved end and a wheel journaled on its other end for normally supporting said vehicle and yielding means interposed between said skid and said plunger.

3. A supporting gear for aerial vehicles comprising a hollow strut having a slot therein, a plunger slidably mounted on said strut, yielding means interposed between said plunger and a fixed connection on said strut, a skid pivoted to the end of said strut, said skid having one end curved and having a wheel journaled on the other end for normally supporting said vehicle, and yielding means interposed between the curved end of said skid and said plunger, said means being connected through the slot in said strut.

Signed at Chicago this 20th day of May, 1914.

WILLIAM E. HANN.

Witnesses:
  ROBERT SACKETT MARTIN,
  M. IRENE HUTCHINGS.